United States Patent
Costa et al.

(10) Patent No.: US 7,141,224 B2
(45) Date of Patent: Nov. 28, 2006

(54) VESSELS AND COVERS

(75) Inventors: Alvin Costa, Tiverton, RI (US);
Richard A. Coffey, Tiverton, RI (US)

(73) Assignee: Zodiac Pool Care, Inc., Pompano Beach, FL (US)

( * ) Notice: Subject to any disclaimer, the term of this patent is extended or adjusted under 35 U.S.C. 154(b) by 676 days.

(21) Appl. No.: 09/876,364

(22) Filed: Jun. 7, 2001

(65) Prior Publication Data

US 2002/0187092 A1 Dec. 12, 2002

(51) Int. Cl.
*B01D 11/02* (2006.01)
*B01D 15/00* (2006.01)
*A61L 2/00* (2006.01)
*B65D 85/50* (2006.01)
*B65D 45/00* (2006.01)

(52) U.S. Cl. .................. 422/261; 422/1; 422/905; 422/256; 422/265; 422/292; 422/300; 422/311; 210/198.1; 210/232; 206/423; 220/315; 220/319; 220/325; 220/327; 220/255; 215/273; 215/274; 215/276; 215/283

(58) Field of Classification Search ............ 422/1, 422/28, 32, 37, 256, 261, 265, 292, 300, 422/311, 905; 210/198.1, 232; 206/423; 220/305, 319, 325, 327, 255, 315; 215/273–274, 215/276, 283
See application file for complete search history.

(56) References Cited

U.S. PATENT DOCUMENTS

| | | | | |
|---|---|---|---|---|
| 4,303,515 A | * | 12/1981 | Rademacher | 210/169 |
| 4,316,801 A | * | 2/1982 | Cooper | 210/90 |
| 4,617,117 A | * | 10/1986 | Messinger et al. | 210/198.1 |
| 4,996,027 A | * | 2/1991 | Kanner | 422/113 |
| 5,128,034 A | | 7/1992 | Kool | |
| 5,660,802 A | * | 8/1997 | Archer et al. | 422/261 |
| 5,993,753 A | | 11/1999 | Davidson | 422/275 |

* cited by examiner

*Primary Examiner*—Gladys J P Corcoran
*Assistant Examiner*—Monzer R. Chorbaji
(74) *Attorney, Agent, or Firm*—Dean W. Russell; Bruce D. Gray; Kilpatrick Stockton LLP

(57) ABSTRACT

Vessels, or housings, and covers therefor are detailed herein. Loads and load-bearing surfaces exist principally at the periphery of the covers, by contrast with centralized loading utilized in other designs. In some versions of the vessels, a cover is sandwiched, at its periphery, between a cap assembly formed of both a jack ring and an upper component or cap and thus carried on and off the associated vessel when the cap is placed onto or removed from the vessel, respectively.

13 Claims, 4 Drawing Sheets

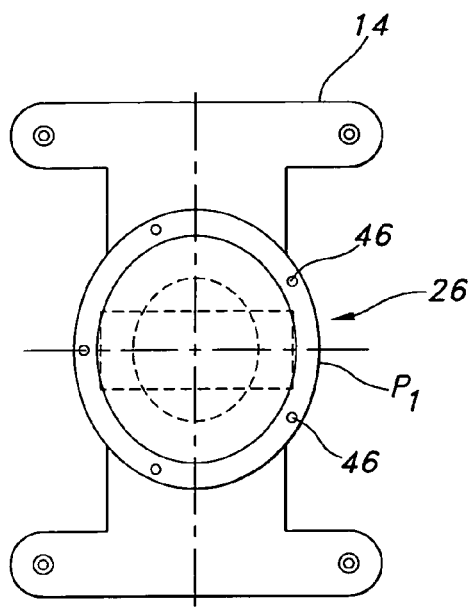
FIG. 3
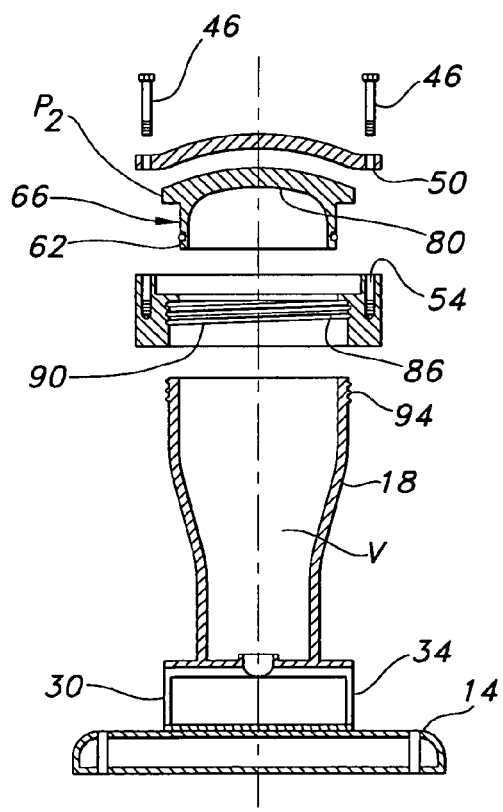
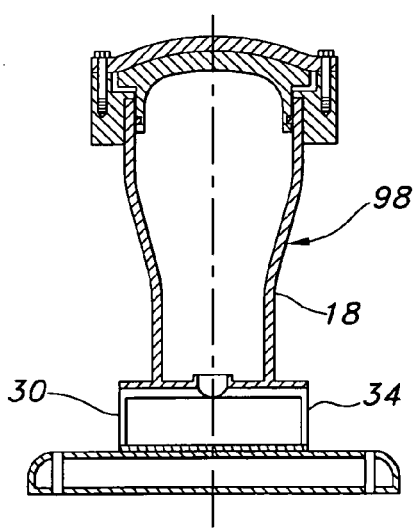
FIG. 2
FIG. 4

VESSELS AND COVERS

FIELD OF THE INVENTION

This invention relates generally to containers, housings, and vessels and their components and more specifically to caps and covers for vessels through which pressurized fluid flows.

BACKGROUND OF THE INVENTION

Commonly-owned U.S. Pat. No. 5,660,802 to Archer, et al., the contents of which are incorporated herein in their entirety by this reference, discloses multiple embodiments of water purification equipment. Included as parts of the equipment are housings, or vessels, having both fluid inlets and outlets. Pressurized fluid (water) flows through an inlet into a body housing, typically, a purification unit, with at least some of the fluid contacting material within the purification unit for treatment.

As noted in the Archer patent:

The water inlet and water outlet are incorporated into a body to which is connected a cover that houses the purification unit. This cover is removable for replacement of the purification unit . . .

See Archer, col. 2, ll. 17–20. In at least some embodiments of the vessels disclosed in the Archer patent, the cover "is typically threaded and . . . includes several ridges that provide gripping surfaces that ease [its] attachment . . . to the body." See id., col. 3, ll. 63–65 (numeral omitted).

U.S. Pat. No. 5,993,753 to Davidson discusses a two-chambered chemical feeder assembly having an inlet, an outlet, and a housing. Included as part of the housing is a cap having an outer annular shoulder, a threaded outer cover and an open, flanged, internally threaded tube in the center of the cap. The outer cover threadedly engages the internally threaded tube, thereby compressing an o-ring effecting a fluid-tight seal between the outer cover and the cap.

See Davidson, col. 3, ll. 46–51 (numerals omitted).

U.S. Pat. No. 4,617,117 to Messinger, et al. details another assembly for pressurized fluids incorporating an inlet, an outlet, and a housing. According to the Messinger patent, the assembly includes "a cover removably attached to the housing in a manner that allows jacking of the cover into and away from sealing engagement with the housing." See Messinger, Abstract, ll. 2–4. A central boss extends outwardly from the cover and has an external cylindrical wall functioning as a bearing surface. The assembly additionally includes a jack ring whose center embraces the external wall of the boss. As noted in the Messinger patent:

when [a] top cover is threaded onto the housing, it engages the removable cover both at its central position adjacent the central aperture of the ring, in the region of the boss on the removable cover, and also at the external periphery thereof, at the ledge of the top cover bearing against [a] flange [of the removable cover]. The jack ring thus carries the removable cover into tight sealing engagement with the housing, closing off the fluid chamber when it has been fully threaded onto the housing.

See id., col. 5, ll. 36–45.

SUMMARY OF THE INVENTION

The present invention provides alternative vessels, or housings, and covers therefor. By contrast with the centralized loading of the assembly of the Messinger patent, for example, that of the present invention has its loads and load-bearing surfaces principally at the periphery of the cover. Assemblies described herein additionally need not incorporate any "cover-retaining screw," again contrary to the device of the Messinger patent, nor any cap press-fitted into a recess of the screw.

Instead, at least some embodiments of the present invention utilize a two-piece cap assembly designed to sandwich the peripheral region of a cover between an upper component and a jack ring. The upper component or cap and jack ring are connected in a suitable manner (as, for example, by bolts or screws), but do not utilize or require any "cover-retaining screw." If desired, the interior surface of the jack ring may be threaded in order to engage complementary threads existing on the exterior of a vessel or housing. Alternatively, other engagement mechanisms may be used.

In embodiments of the invention in which the jack ring is threaded, unscrewing the jack ring operates effectively to "lift," or carry, both the cover and upper component of the cap assembly off of the vessel. Conversely, screwing the jack ring onto the vessel carries both the cover and upper component of the cap assembly back into position. During either process, loading occurs principally at the periphery of the cover, the portion of the cover at which contact with the jack ring and cap occurs. A downwardly-protruding section of the cover additionally may be subject to loads if friction-fit into the vessel to assist in sealing the cover to the interior of the vessel, and further sealing may be enhanced through use of an o-ring (or similar device) placed in a groove in that downwardly-protruding section.

It thus is an object of the present invention to provide vessels and covering apparatus therefor.

It is also an object of the present invention to provide covering apparatus for vessels in which a cover is loaded principally at its periphery when attached to or detached from its corresponding vessel.

It is another object of the present invention to provide covering apparatus in which a multi-piece cap assembly sandwiches a cover in use.

It is a further object of the present invention to provide covering apparatus omitting any "cover-retaining screw" or "central boss."

It is an additional object of the present invention to provide covering apparatus in which the multi-piece cap assembly includes a jack ring and an upper cap attached thereto.

Other objects, features, and advantages of the present invention will be apparent to those skilled in the relevant art with reference to the remaining text and the drawings of this application.

BRIEF DESCRIPTION OF THE DRAWINGS

FIG. 2 is a front sectional view of the vessel of FIG. 1.

FIG. 3 is a top view of the vessel of FIG. 1.

FIG. 4 is an exploded sectional view of the vessel of FIG. 1.

DETAILED DESCRIPTION

Figure 1:
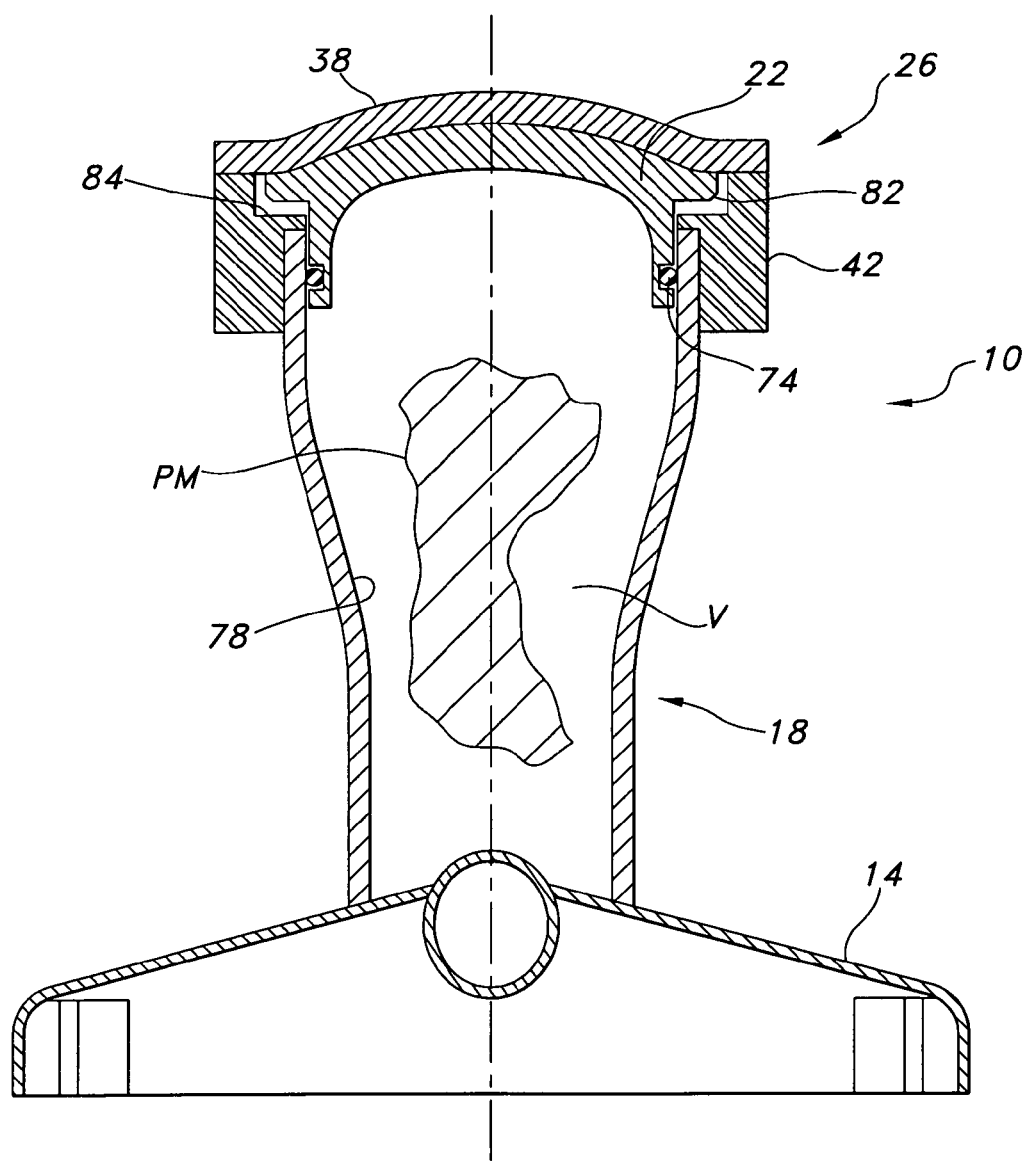
FIG. 1 is a side sectional view of an exemplary vessel of the present invention.
Figure 5:
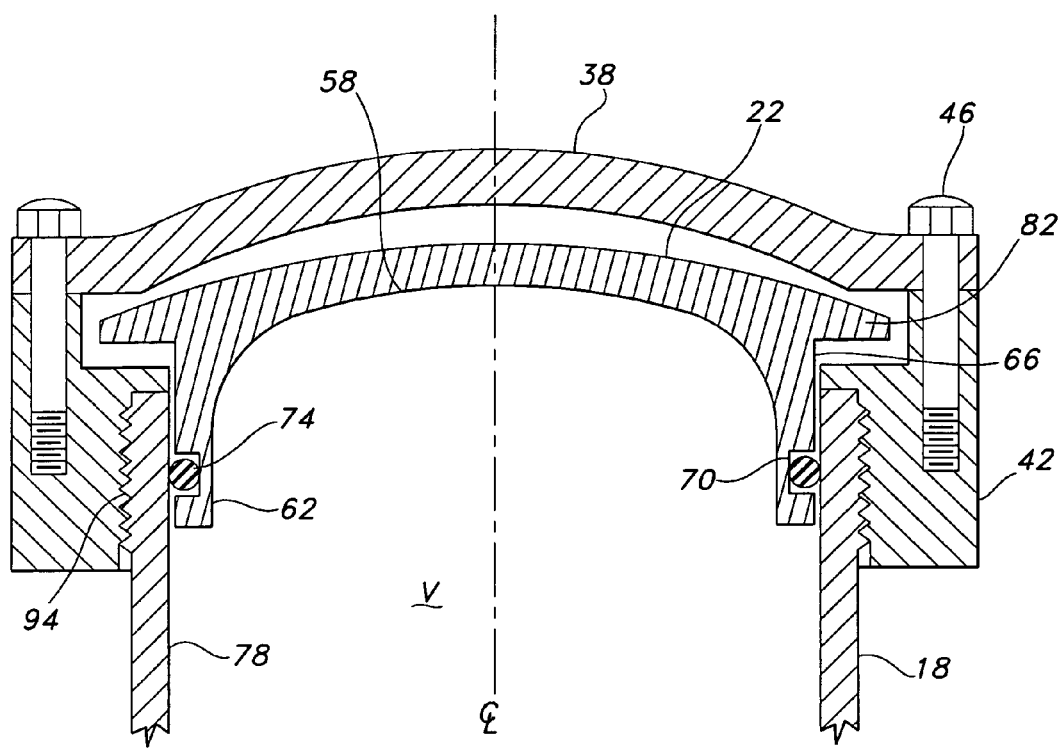
FIG. 5 is a cross-sectional view of an exemplary covering apparatus forming part of the vessel of FIG. 1.

FIGS. 1–3 illustrate various features of an exemplary vessel 10. Although the term "vessel" is used herein frequently in connection with element 10, other words, including but not limited to "housing" or "container," may be utilized instead. Indeed, even though some embodiments of vessel 10 are intended for use as water-purification equipment, the invention is not limited to this intended use but rather may be employed in any suitable circumstance, including instances in which element 10 is none of a vessel, housing, or container. Nevertheless, for purposes of this document the terms "vessel," "housing," and "container" are used synonymously, and reference to any of them contemplates reference to the others.

Shown in FIGS. 1–3 as part of vessel 10 are base 14, upstanding wall 18, cover 22, and cap assembly 26. At least base 14 and wall 18 may be formed integrally if desired, although the instead may attach or connect in any appropriate way. Typically molded of plastic material (such as, but not limited to, polyvinyl chloride), base 14 and wall 18 partially define an interior volume V desirably sealed on occasion from the ambient environment.

Also detailed in FIG. 2 are inlet and outlet 30 and 34, through each of which fluid may flow. Depending on placement of vessel 10 within a system and the direction of fluid flow, either element 30 or element 34 may function as the nominal "inlet" of the vessel 10. Generally, however, if element 10 is the "inlet," then element 34 is the nominal "outlet" and vice-versa. Regardless, preferred embodiments of vessel 10 contemplate pressurized fluid flowing into one of elements 30 or 34, being deflected or otherwise channelled or diverted into volume V, and flowing out the other of elements 30 or 34.

If vessel 10 is adapted for use as water-purification equipment, then purifying material PM, shown schematically in FIG. 1, beneficially may be placed within volume V. Various non-limiting examples of such purifying material containing silver or zinc (or both) are disclosed in commonly-owned U.S. Pat. Nos. 5,352,369 to Heinig, Jr. and 5,772,896 and 5,779,913 to Denkewicz, Jr., et al., the contents of each of which patents being incorporated herein in its entirety by this reference. Chlorine (in tablet, liquid, or other form), bromine, or other water-purification or filtration materials may also be placed within volume V, either instead of or in addition to the exemplary materials mentioned in the preceding sentence. If, alternatively, vessel 10 is employed for purposes other than purifying or filtering water, other solids, liquids, or gases might be included within volume V.

Each of FIGS. 1–5 illustrates one or more aspects of cover 22 and cap assembly 26 of the present invention. Cap assembly 26 may comprise upper component or cap 38 and jack ring 42, each of which may be generally circular if wall 18 is likewise configured. Cap 38 and jack ring 42 usually are attached as, for example, by bolts 46 inserted through aligned openings 50 and 54 in each of cap 38 and ring 42, respectively. Although FIG. 3 shows five bolts 46 equally spaced about periphery $P_1$ of cap 38, more or fewer bolts 46 may be utilized instead. Likewise, those skilled in the art will recognize that any suitable fastening mechanism may be employed in place of any or all of bolts 46 when necessary or desired or that in some situations cap 38 and ring 42 could be integrally formed.

As detailed principally in FIGS. 1–2 and 4–5, cover 22 may include top 58 and wall 62 extending downwardly therefrom. Incorporated into exterior surface 66 of wall 62 may be groove 70 in which o-ring 74 or another sealing device may be fitted. When wall 62 is friction-fitted into wall 18 (so that exterior surface 66 contacts interior surface 78 of wall 18), o-ring 74 helps seal volume V from the ambient environment.

Locating downwardly-extending wall 62 inward of periphery $P_2$ of cover 22 effectively defines a central region 80 and a shoulder or flange 82 at periphery $P_2$. Assuming top 58 and wall 62 are generally circular, flange 82 typically should be likewise, although other configurations of flange 82 may be employed. Regardless of configuration, however, flange 82 is intended to be positioned, or sandwiched, between cap 38 and ledge 84 of jack ring 42 when cap assembly 26 is operational.

In use, therefore, cover 22 and cap assembly 26 may be attached to or detached from wall 18 as a unit. Interior surface 86 of jack ring 42 may be threaded to facilitate this attachment and detachment, with threads 90 engaging complementary threads 94 on exterior surface 98 of wall 18. Thus, to connect both cover 22 and assembly 26 to wall 18, one need merely screw ring 42 onto the wall 18. Again, however, those skilled in the art will understand that neither threads 90 nor threads 94 need necessarily be present, as other connection mechanisms may be employed. Similarly, neither the "cover-retaining screw" nor any cap press-fitted therein need be present, in contrast with the Messinger patent.

Because cap 38 is connected to jack ring 42 and flange 82 of cover 22 is sandwiched therebetween, unscrewing ring 42 from wall 18 effectively lifts, or carries, both cap 38 and cover 22 off of the remainder of vessel 10. The converse additionally is true: screwing ring 42 onto wall 18 carries both cap 38 and cover 22 into position to seal vessel 10. In either circumstance, loading of cover 22 occurs principally at flange 82, the portion of the cover 22 that contacts and is sandwiched between cap 38 and ring 42.

In some embodiments of vessel 10, cover 22 and cap assembly 26 are removable to provide access to volume V as, for example, when a purification or other cartridge contained therein requires handling or removal for replacement of refurbishment. Otherwise, however, cap assembly 26 is intended to attach securely to wall 18 with cover 22 snugly in position to resist possible escape of pressurized fluid from volume V. If for some reason such escape would ever be desired, threads 90 and 94 could be manufactured to fail when certain fluid pressure within vessel V is achieved.

Figure 6:
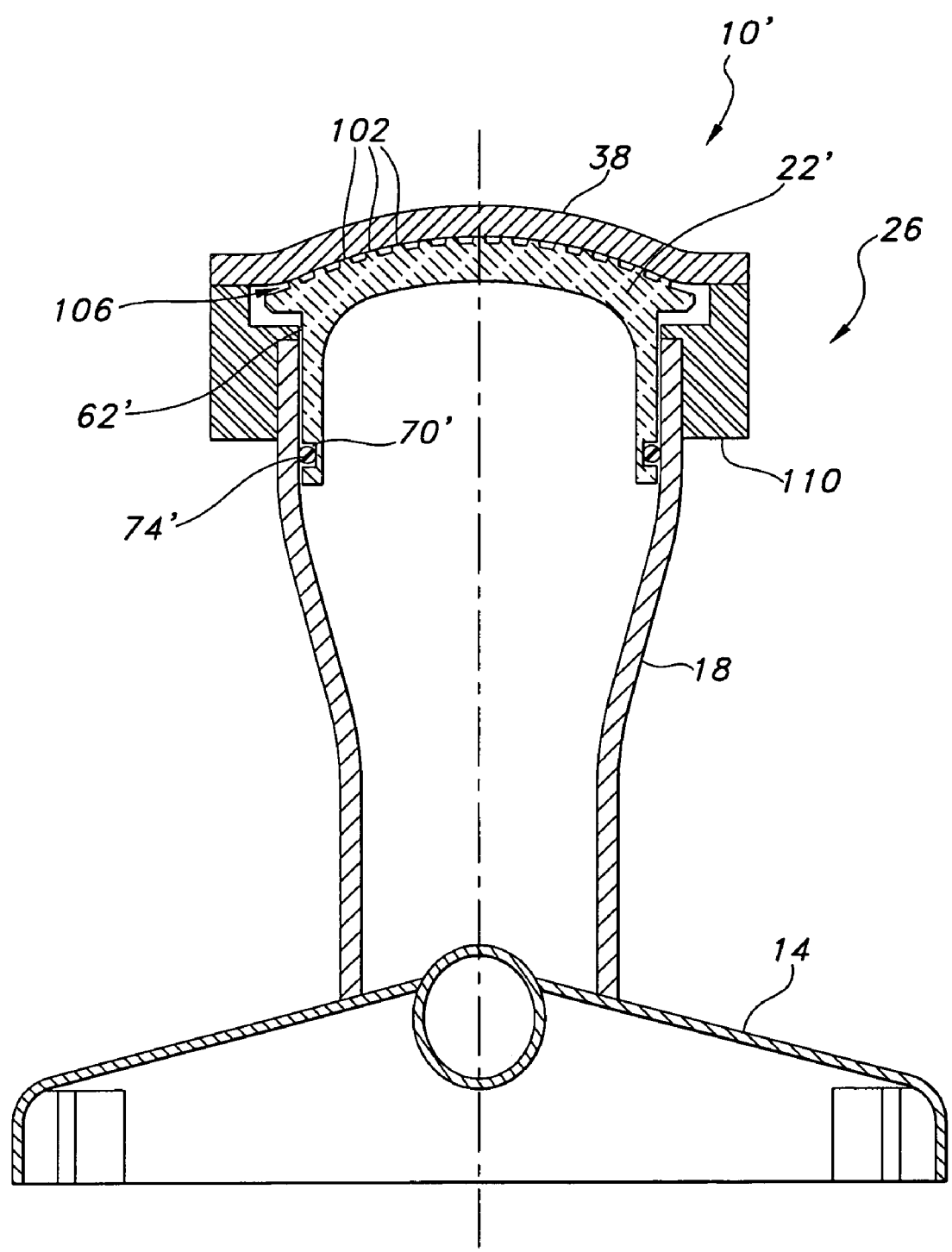
FIG. 6 is a side sectional view of an alternative vessel of the present invention.

Illustrated in FIG. 6 is an alternative vessel 10' comprising a cover 22' differing from cover 22 in various ways. Unlike cover 22, for example, cover 22' may have ridges 102 (or other features) present on or in its upper surface 106. Utilizing this structure reduces the area in which cover 22' and cap 38 contact when cap assembly 26 is being attached to wall 18. Decreasing the contact area reduces friction between the cover 22' and cap 38, facilitating their attachment to wall 18. Alternatively or additionally, a film, disc, or other object or coating (not shown in FIG. 6) with a relatively low coefficient of friction may be interposed between cover 22' and cap 38 in use.

Moreover, wall 62' of cover 22' is longer than wall 62 of cover 22. Visible in FIG. 6 is that, for this embodiment, groove 70' and o-ring 74 extend below lower edge 110 of ring 42 (i.e. closer to base 14). Thus, when cap assembly 26 is detached from wall 18, o-ring 74 is immediately easily accessible for inspection or removal.

The foregoing has been provided for purposes of illustrating, explaining, and describing embodiments of the present invention. Further modifications and adaptations to these embodiments will be apparent to those skilled in the art and may be made without departing from the scope or spirit of the invention.

What is claimed is:

1. A vessel comprising:
   a. an inlet;
   b. an outlet;
   b1. an interior volume in fluid communication with the inlet and outlet, and comprising a wall with an opening therein;
   c. a cover having a periphery and adapted to close the opening in the wall of the interior volume; and
   d. a cap assembly surrounding at least a portion of the periphery and comprising a ledge disposed between the cover and the wall, wherein the cap assembly is adapted so that rotation of the cap assembly forces the cover against the opening, sealing it, and counterrotation of the cap assembly engages the ledge against the periphery of the cover, and thereby forces the cover away from the opening, unsealing it, wherein both forces are applied principally at the periphery of the cover.

2. A vessel according to claim 1 in which the cover comprises a flange forming the periphery.

3. A vessel according to claim 2 in which the cover further comprises a central region bounded by the flange and a first wall extending from the central region.

4. A vessel according to claim 3 further comprising a base and a second wall extending from the base.

5. A vessel according to claim 4 in which the cap assembly comprises a jack ring and a cap connected to or integrally formed with the jack ring, the jack ring having threads complementary to the threads of the second wall to permit attachment of the jack ring to the second wall.

6. A vessel according to claim 5 in which the jack ring and cap are connected together in a manner permitting detachment thereof.

7. A vessel according to claim 6 further comprising a water-purification or filtration material.

8. A vessel according to claim 7 in which the cap assembly comprises:
   a. a jack ring defining the ledge; and
   b. a cap connected to or integrally formed with the jack ring; and in which the cover contacts the ledge at least during unscrewing of the jack ring.

9. A vessel according to claim 4 in which the second wall is tapered.

10. A vessel according to claim 1 in which the cap assembly comprises:
    a. a ring; and
    b. a cap connected to or integrally formed with the ring.

11. A vessel according to claim 1 in which the cover has a ridged upper surface.

12. A vessel according to claim 1 further comprising a sealing ring and in which (i) the cap assembly comprises a jack ring and (ii) the cover comprises a first wall having a groove adapted to receive the sealing ring such that the sealing ring is accessible immediately for inspection or removal when the cap assembly is removed from the vessel.

13. A vessel through which pressurized water flows, the vessel comprising:
    a. a base;
    b. a generally-cylindrical wall extending upward from the base and having an interior surface and a threaded exterior surface;
    c. a jack ring defining an interior surface having threads adapted to engage the threads of the exterior surface of the generally-cylindrical wall and comprising a ledge;
    d. a cap connected to or integrally formed with the jack ring;
    e. a cover comprising a peripheral flanged portion, a central portion, and a wall extending from the central portion, the peripheral flanged portion sandwiched between the cap and jack ring in contact with the ledge the ledge being disposed between the generally-cylindrical wall and the cover so that loading of the cover occurs principally by contact between the peripheral flanged portion and the cap, and so that unloading of the cover occurs principally by contact between the peripheral flanged portion and the ledge lifting the cover away from the wall, the wall friction-fitted into contact with the generally-cylindrical wall when the threads of the jack ring engage the threads of the generally-cylindrical wall, and the wall defining a groove;
    f. an o-ring positioned in the groove; and
    g. water-purification material contained within the generally-cylindrical wall.

* * * * *